July 21 1925.  1,546,755
D. J. SCHULTE
UNIVERSAL JOINT
Filed March 9, 1922  2 Sheets-Sheet 1
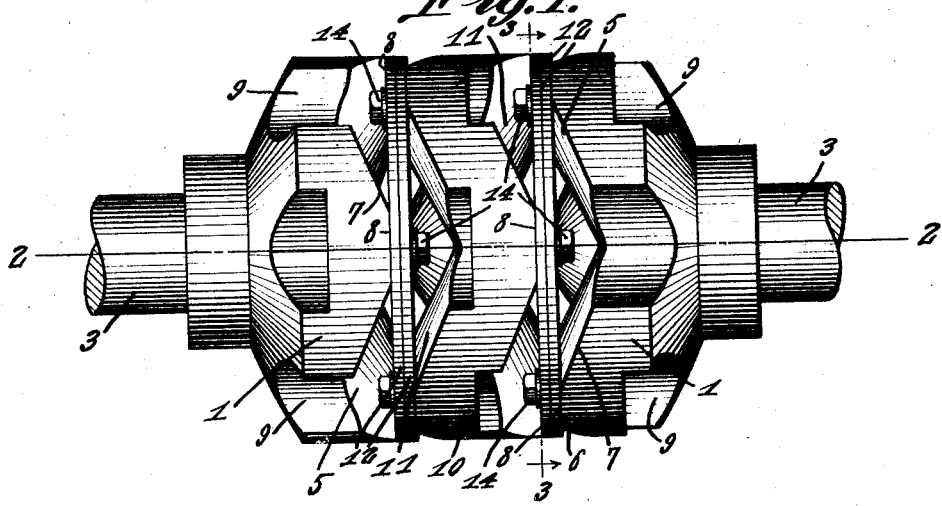
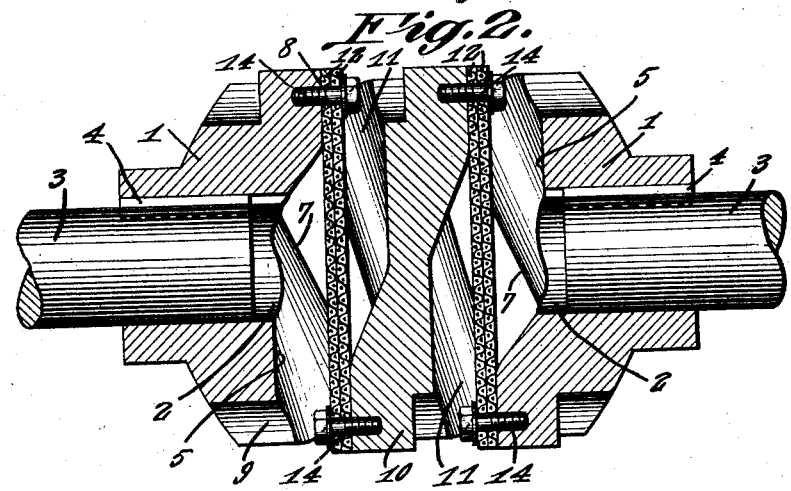
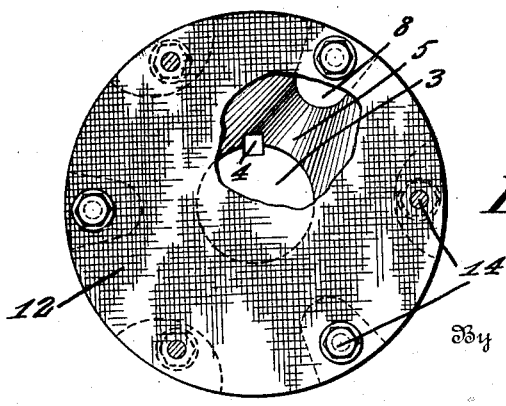
D. J. Schulte, Inventor July 21 1925.                                                1,546,755
                         D. J. SCHULTE
                         UNIVERSAL JOINT
                       Filed March 9, 1922          2 Sheets-Sheet 2

Patented July 21, 1925.

1,546,755

UNITED STATES PATENT OFFICE.

DAVID J. SCHULTE, OF LATROBE, PENNSYLVANIA, ASSIGNOR OF ONE-HALF TO CHARLES R. SIPE, OF LATROBE, PENNSYLVANIA.

UNIVERSAL JOINT.

Application filed March 9, 1922. Serial No. 542,388.

*To all whom it may concern:*

Be it known that I, DAVID J. SCHULTE, a citizen of the United States, residing at Latrobe, in the county of Westmoreland and State of Pennsylvania, have invented a new and useful Universal Joint, of which the following is a specification.

This invention aims to provide a simple universal joint consisting of but few parts and avoiding the complications usually met with in the construction of a universal joint.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention; Figure 2 is a section on the line 2—2 of Figure 1; Figure 3 is a section on the line 3—3 of Figure 1; Figure 4 is a section showing a modification; Figure 5 is an end elevation of the structure shown in Figure 4; and Figure 6 is an end elevation showing a modification.

As shown in Figures 1, 2 and 3, there is provided a pair of main members 1, each of which is provided with a bore 2, adapted to receive a shaft 3, the shaft being secured in the main members as shown at 4. The inner surface of each main member 1 is provided with radial recesses 5 defining radial ribs 6 having transversely inclined surfaces 7 connected by a flat surface 8, the flat surface 8 being disposed at right angles to the axis of the member 1. Notches 9 are formed in the edges of the members 1 and 2. An intermediate member 10 is disposed between the main members 1, and is provided on its opposite surfaces with ribs 11, constructed as set forth in connection with the description of the ribs 6 of the main members 1, the ribs 11 of the intermediate member 10 being disposed opposite to the recesses 5 of the members 1. Disposed between each of the main members 1 and the intermediate member 10 are flexible disk connections 12 which may be made of canvas or any other suitable material. The flexible disk connections 12 rest against the flat surfaces 8 of the ribs of the members 1 and 10, and are connected thereto by securing elements 14, the notches 9 giving access to those securing elements 14 whereby the disk connections 12 are secured to the intermediate member 10.

In practical operation, when the shafts 3 are alined, the disk connections 12 are not flexed, but remain straight, as indicated in Figures 1 and 2. When, however, the shafts 3 are disposed at an angle to each other, the ribs 11 of the intermediate member 10 are received to a greater or less extent in the recesses 5 of the members 1, the ribs 6 of the members 1 being received in the recesses of the intermediate member.

The device is simple in construction and avoids the multiplicity of relatively movable parts which are commonly met with in universal joints.

As shown in Figures 4 and 5, each member 15 is in the form of a bar including an intermediate hub 16, shafts 17 being secured in the hub 16 as indicated at 18, one main member 15 preferably being disposed at right angles to the other main member 15. The main member 15 includes lateral arms comprising intermediate portions 19 which slope in the direction of the axis of the main member and terminate in end portions 26 disposed at right angles to the axis of the main member. The intermediate member is in the form of a cross, and is denoted by the numeral 20, the arms of the cross being marked by the reference numerals 21 and 22, the arms of the intermediate member sloping in the direction of the axis of the intermediate member and terminating in end portions 25 which are located approximately at right angles to the axis of the intermediate member. Flexible disk connections 23 constructed as hereinbefore described, are located between the main members 15 and the intermediate members 19 and are connected to the ends 26 of the main members and to the ends 25 of the arms 22 and 21 of the intermediate member 20 by securing devices 24.

The operation of the device delineated in Figures 4 and 5 do not differ materially from the operation of the structure shown in Figures 1, 2 and 3.

In Figure 6, the main member is shown at 27, the flexible disk connection at 28, the securing means at 29, the notches in the main member at 30, the shaft at 31 and the securing means for the shaft at 32. Comparing Figure 6 with Figure 3, it will be obvious that the number of securing elements whereby the disk connections 28 are held in place, may be increased or diminished at will.

What is claimed is:—

1. In a universal coupling, main members and an auxiliary member between the main members, the inner surface of each main member and both surfaces of the auxiliary member being provided with radial ribs having transversely inclined surfaces, the ribs of the main members alternating with the ribs of the auxiliary member circumferentially of the joint, and flexible disks connected to the ribs of the main and auxiliary members and located between the main members and the auxiliary member, the disks being normally flat, but being adapted to flex, to permit the rib of one member to be received between the ribs of an adjoining member, the main and auxiliary members cooperating to form a coupling which is cylindrical in form.

2. A device of the class described constructed as set forth in claim 1, and further characterized by the fact that the ribs have flat surfaces against which the disk connections abut, and securing elements uniting the disks with the ribs, the main members having superficial notches which give access to those securing elements which unite the disk connections with the auxiliary member.

In testimony that I claim the foregoing as my own, I have hereto affixed my signature in the presence of two witnesses.

DAVID J. SCHULTE.

Witnesses:
G. M. FINCIK,
H. E. DUKE.